P. J. GRIFFIN.
VALVE.
APPLICATION FILED SEPT. 27, 1919.
1,331,194.
Patented Feb. 17, 1920.
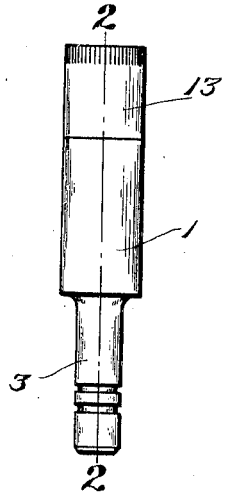
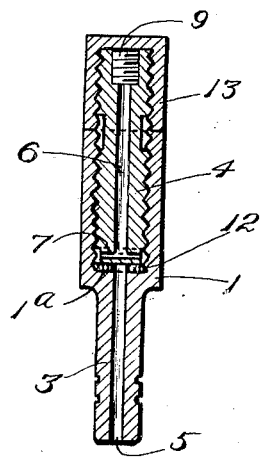
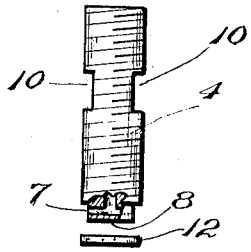
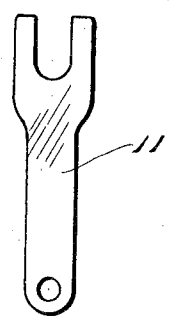
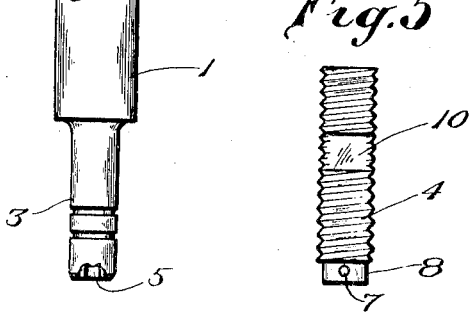
WITNESS:
Leo J. Griffin.
INVENTOR:
Patrick J. Griffin.
BY Chas. F. Randall
ATTORNEY:

UNITED STATES PATENT OFFICE.

PATRICK J. GRIFFIN, OF DORCHESTER, MASSACHUSETTS.

VALVE.

1,331,194.   Specification of Letters Patent.   Patented Feb. 17, 1920.

Application filed September 27, 1919. Serial No. 326,733.

*To all whom it may concern:*

Be it known that I, PATRICK J. GRIFFIN, a citizen of the United States, residing at Dorchester, in the county of Suffolk, State of Massachusetts, have invented a certain new and useful Improvement in Valves, of which the following is a specification, reference being had therein to the accompanying drawings.

The object of the invention is to provide an air-valve of simple, convenient, and practical character and construction, adapted for application to the inner tubes of pneumatic tires, to air-cushions, life-preservers, and other inflated devices, and so designed as to obviate the disadvantages of the plunger valves heretofore employed, and to provide a positive air-locking valve adapted to be sealed against leakage even in the event of foreign matter such as dirt or oil entering the valve.

In the drawings:—

Figure 1 is a view of a valve embodying the invention.

Fig. 2 is a vertical cross-section of the valve on line 2, 2, of Fig. 1.

Fig. 3 is a view of the component parts of the valve, separated from one another, certain of them partly broken away to show details of construction.

Fig. 4 shows a key or wrench such as may be used in manipulating the valve.

Fig. 5 is a detail view of the screw-threaded male valve-member.

Referring to the drawings,—

The valve casing or body 1 is made in suitable form for attachment to the air container on which the valve may be used; in the present instance, its lower portion 3 is reduced in diameter and provided with annular grooves and is designed to be inserted and secured within the inflation tube of the said air container. The upper portion of said valve casing 1 is chambered and also threaded internally, as shown in Fig. 2, to receive the one-piece externally-threaded valve-member 4. An air-passage 5 extends longitudinally of the valve-casing or body, usually axially thereof in practice, from the inner end of the chamber to the free end of the stem 3 of the casing or body. The shoulder, 1ª, at the inner end of the chamber, around the opening of the passage 5, constitutes a valve-seat, to which is applied the packing-ring or washer 12. The externally-threaded valve-member 4 has an axial passage 6, Fig. 2, extending nearly to the inner end thereof; at its inner end the said axial passage connects with a transverse, radial bore 7 drilled through the inner end 8, Figs. 3 and 5, of said valve-member. The portion of the latter which contains the transverse bore 7 is of reduced diameter, *i. e.*, smaller than the main portion of such member, and terminates in a plane unperforated face for coaction with the valve-seat and its packing-ring or washer 12. The said member, in addition to being threaded exteriorly to fit the internally-threaded chambered upper portion of valve casing 1, is formed at its outer end with an internal small chamber 9 to accommodate the screw-threaded coupling device at the end of the tube or hose used for conducting the air to the valve. It also is formed with slabbed-off or flattened faces 10, 10, to receive the jaws of a key or wrench 11. A dust-cap 13 is provided, internally threaded to fit and screw upon the portion of member 4 projecting out from the valve casing 1, and adapted to be screwed upon said member 4 until the rim or flange of the dust-cap fits snugly and firmly against the outer end of the valve casing or body 1. If desired, a disk of packing (not shown) may be placed inside the dust-cap 13, further to seal the bore 6 in said member 4.

The operation of my improved valve is simple and positive. The dust-cap 13 is removed, and the tube from the air supply connected with the top of the member 4. With the key or wrench 11 applied to the flattened faces 10, 10, the member 4 is turned to lift its inner end a minute distance away from the washer 12. A free flow of air thereupon occurs, down the passage 6, transversely through the bore 7, around the reduced portion 8, thence between the inner end of member 4 and washer 12, through the central hole in the latter, and thence down passage 5 into the part to be inflated. When the desired air pressure within the said part has been attained, member 4 is turned down to seat tightly upon the washer 12, whereby the valve is sealed. The dust-cap 13 is then screwed down tightly so that its rim or flange bears upon the top of valve casing or body 1, thus serving as a lock-nut to lock said member 4 against all chance of jarring loose and opening the valve. In deflating, the member 4 is raised a minute amount, allowing free escape of the contained air without the awkwardness and difficulty of depressing a plunger terminating in a fine point.

What is claimed as the invention is:

A valve comprising a chambered body having a passage extending longitudinally from the inner end of its chamber, with a valve-seat at said inner end around the said passage, a packing-ring applied to the said valve-seat, a one-piece valve-member screwing into the chamber and having an inner end-portion of reduced diameter with an unperforated face which co-acts with said valve-seat, an axial passage from its outer end inward to near said face, and a radial passage in said reduced portion intersecting said axial passage and opening at the exterior of said reduced end-portion, said valve-member also slabbed off in its outer portion for engagement by an implement for turning the same, and a dust-cap screwing upon the exposed outer end of said valve-member and into contact with the body-member, thereby completely inclosing said outer end and by reason of the said contact with the body-member serving as a lock-nut.

In testimony whereof I affix my signature in presence of two witnesses.

PATRICK J. GRIFFIN.

Witnesses:
NATHAN B. DAY,
CHAS. F. RANDALL.